United States Patent Office 3,256,347
Patented June 14, 1966

3,256,347
REACTION OF DIISOPROPYLBENZENE-α,α'-DIOL WITH PHENOLIC COMPOUNDS AND PRODUCTS THEREOF
Salvatore A. Casale, Morris Township, Morris County, Thomas M. Cawthon, Dover, and Wilbert M. Wenner, Rockaway, N.J., assignors to Allied Chemical Corporation, New York, N.Y., a corporation of New York
No Drawing. Filed Apr. 30, 1962, Ser. No. 191,279
5 Claims. (Cl. 260—619)

This invention relates to epoxide resins and more particularly refers to new and improved epoxide resins and process for their preparation.

Epoxide resins are one of the newest and most versatile of modern plastics. Their commercial success has been due to their outstanding chemical and mechanical properties whcih render them useful as surface coatings, industrial castings, high-strength adhesives, durable laminates, cold solders, lightweight foams and potting compounds for all varieties of electrical and electronical apparatus.

In order to adapt and expand their area of application, the inherent property of hardness must be complemented by a sufficient degree of flexibility and elasticity. More particularly, since these epoxide resins are inherently rigid, they tend to chip and crack under industrial conditions, thereby severely curbing their utility. In order to overcome this basic disadvantage, epoxide resins are usually cured to thermoset condition in conjunction with various plasticizing agents.

Generally, epoxide resins prepared from relatively simple dihydroxy compounds such as resorcinol and 2,2-bis(4,4'-phenylhydroxy)propane, are readily susceptible to modification by the addition of plasticizing agents. However, where more complex compounds are employed, this disadvantage of incompatability with conventional plasticizers arises as a significant factor in their industrial application and success.

An object of the present invention is to provide new epoxide resins which possess desirable properties of hardness, durability and chemical inertness. Another object is to provide new epoxide resins which are readily compatible with conventional plasticizers. A further object is to provide a method for preparing new epoxide resins having improved properties. A still further object is to provide a method for preparing an intermediate compound for the preparation of these new epoxide resins. Other objects and advantages will be apparent from the following description.

These new epoxide resins having the desirable properties of hardness, durability and chemical inertness and compatible with plasticizers, may be prepared in accordance with the present invention by reacting diisopropylbenzene-α,α'-diol, preferably para-diisopropylbenzene-α,α'-diol or meta-diisopropylbenzene-α,α'-diol which exhibit high reactivity, or mixtures thereof and a phenolic compound having the formula:

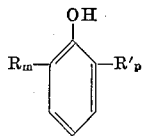

wherein R and R' are selected from the group consisting of methyl, ethyl, methoxy, ethoxy, chloro, bromo, iodo and fluoro and $m$ and $p$ are integers ranging from 0 to 1, preferably in a molar proportion form about 0.5 to 4 mols, desirably 0.8 to 1.1 mols of phenolic compound per mol of diisopropylbenzene-α,α'-diol at a temperature within the range of about 30° C. to 200° C. preferably 80° C. to 150° C. in the presence of an organic solvent inert under the reaction conditions and in the presence of an acid-activated clay catalyst to effect reaction of the phenolic compound and the diisopropylbenzene-α,α'-diol to produce a product hereinafter referred to as product A having the formula:

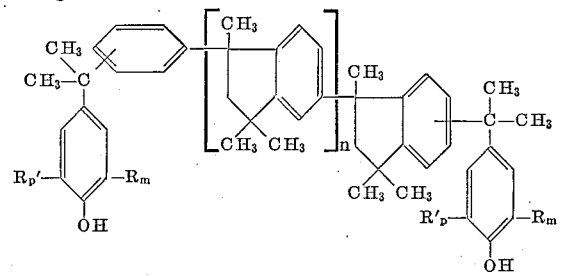

wherein R and R' are selected from the group consisting of methyl, ethyl, methoxy, ethoxy, chloro, bromo, iodo and fluoro, and $m$ and $p$ are integers ranging from 0 to 1, and $n$ is an integer ranging from 0 to 8, preferably 0 to 5, admixing said product A with a halohydrin in a molar proportion of about 1 to 15 mols of halohydrin per mol of said product A and maintaining said mixture in the presence of a basic medium at a temperature within the range of about 20° C. to 120° C., preferably 80° C. to 110° C. to effect reaction of the halohydrin and product A to produce epoxy resinous reaction product.

The product A is a new compound produced by reaction of diisopropylbenzene-α,α'-diol and a phenolic compound as illustrated by the following equation:

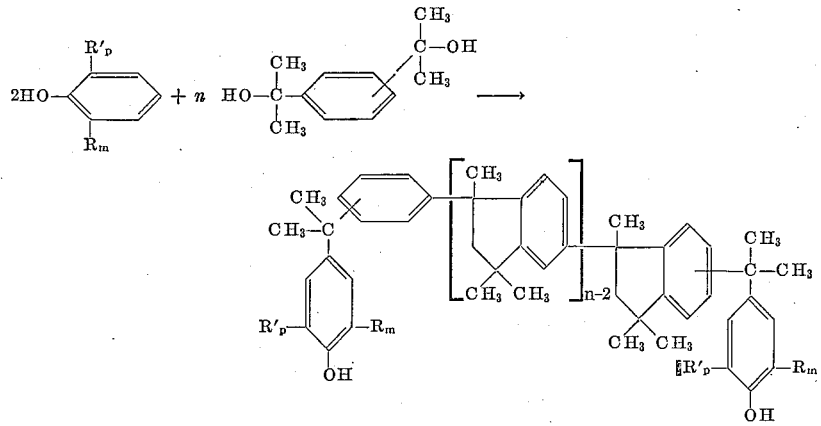

wherein $n$ is an integer of at least 2, R and R' are selected from the group consisting of methyl, ethyl, methoxy, ethoxy, chloro, bromo, iodo and fluoro, and $m$ and $p$ are integers from 0 to 1.

The reactant p-diisopropylbenzene-α,α'-diol and m-diisopropylbenzene-α,α'-diol are white crystalline solids having melting points of 141° C. and 136° C., respectively.

The reactant phenolic compound may be of the general formula heretofore recited and of which the following compounds are illustrative:

Phenol
2-chlorophenol
2,6-dichlorophenol
2-methylphenol
2,6-dimethylphenol
2-methoxyphenol
2,6-dimethoxyphenol
2-ethoxyphenol
2-bromophenol
2-methyl-6-methoxyphenol
2-methyl-6-fluorophenol
2,6-diethoxyphenol In order to obtain high yield of the new product A, control of the conditions of reaction is important.

One such condition is the molar ratio of the reactants. It has been found that molar ratios in excess of 4 mols of phenolic compounds per mol of diisopropylbenzene-α,α'-diol produces a reaction product which contains about 50 percent or more by weight of impurities while molar ratios less than about 0.5 mols of phenolic compound per mol of diisopropylbenzene-α,α'-diol produces a substantial quantity of product A devoid of p-phenol end groups. Thus, molar ratios ranging from about 0.8 to 3 mols of phenolic compound per mol of diisopropylbenzene-α,α'-diol have been found to produce optimum yields, with the molar ratios of 0.8 to 1.1 being preferred.

Further, it has been found that the reaction of the phenolic derivative with diisopropylbenzene-α,α'-diol will not commence to a significant degree unless a catalyst is employed. Conventional mineral acid or Lewis acid catalyst have been found to be ineffective. In contrast, substantial yields in the order of about 70 to about 95 percent of theoretical of the desired product A are readily realized when an acid-activated silicious material is present during the reaction. Generally speaking, an acid-activated clay consisting chiefly of silica and alumina is to be preferred. More specifically, an acid-activated clay of the non-swellable, bentonite-type consisting of about 40 to 90 percent by weight of silica and about 3 to 20 percent of alumina, as well as small quantities of one or more oxides of other metals such as iron, magnesium, sodium, calcium and potassium has been successfully employed. The quantity of catalyst is not critical and may vary over a wide range. Generally, up to 40 percent by weight based on the amount of the reactants is employed with the range of 5 to 20 percent being preferred.

A silicious material in the form of a porous clay may be acid-activated by any suitable procedure. For example, a slurry of 1 part by weight of clay to 10 parts by weight of 5 percent mineral acid solution may be boiled for a period of 1 hour. The excess spent acid may then be separated from the clay, first by settling and decantation followed by wringing of the wet clay. The resulting acid-activated silicious material may then be dried to a powder in a flash drier.

Another factor is the requirement of a suitable solvent during the reaction for the resulting product A. If a solvent is absent, the reaction does not proceed as desired. The amount of solvent may vary over a considerable range and in practice an organic solvent employed in the amount of about 50 to 200 percent by weight based upon the amount of the reactants has been found satisfactory. Normally, organic solvents which are inert under the conditions of the reaction and which dissolve product A are suitable. Illustrative examples of suitable solvents are benzene, toluene, xylene, sym-tetrachloroethane, cyclohexane and the like.

Although reaction temperatures in the range from about 30° C. to about 200° C. may be employed, it has been found that optimum yields of highest purity are secured when reaction temperatures of about 80° C. to about 150° C. are utilized.

In preferred operation, the diisopropylbenzene-α,α'-diol and phenolic reactants are admixed and heated in the presence of an acid-activated silicious material and an organic solvent to a temperature of about 80° C. to 150° C. for a period of about 1 hour. The reaction mixture is filtered to remove the acid-activated silicious material. Isolation is effected by the addition of water to the reaction mixture and organic solvent removed by azeotropic distillation followed by filtration of the insoluble product A from the remaining aqueous phase. Any impurities in the form of 1,4-bis(p-hydroxycumyl) benzene may be disposed of by the addition of a suitable solvent such as carbon tetrachloride followed by isolation of the purified product A by filtration and conventional drying procedures.

The next step in the reaction is the production of product A with a halohydrin. The halohydrins are well known compounds and may be generally described as hydrocarbon compounds in which a halogen is attached to a carbon atom and which contain an epoxide group or have a hydroxyl group attached to the carbon atom adjacent to the carbon atom to which is attached a halogen. The halohydrins as exemplified by the haloepoxide type compound have the general formula:

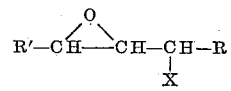

wherin R and R' are hydrogen or an organic radical having 1 to 5 carbon atoms containing only inert substituents, and X is a halogen.

The halohydrins which contain a hydroxyl group may be exemplified by the formula:

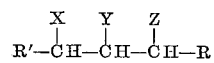

wherein R and R' are hydrogen or an organic radical having 1 to 5 carbon atoms containing only inert substituents, X is a halogen and Y and Z are halogens or hydroxyls, such that Y is halogen when Z is hydroxyl and conversely. These halohydrins may also be successfully employed since under the conditions of reaction they convert, in situ, into compounds having an epihalo structure. Illustrative examples of the reactant halohydrins are as follows:

1-chloro-2,3-epoxypropane
1-chloro-2,3-epoxybutane
1-chloro-2,3-epoxypentane
1-chloro-2,3-epoxyhexane
1-bromo-2,3-epoxypropane
1-bromo-2,3-epoxybutane
1-bromo-2,3-epoxypentane
1-bromo-2,3-epoxyhexane
1,3-dichloro-2-propanol
1,3-dibromo-2-propanol
1,2-dichloro-3-propanol
1,2-dibromo-3-propanol
1,3-dichloro-2-butanol
1,3-dibromo-2-butanol
3,5-dichloro-4-hexanol
3,5-dibromo-4-hexanol The physical and mechanical properties of the resulting epoxide resin may be regulated to satisfy the demand of the anticipated application by varying the molar ratio of the reactants and in general a range of 1 to 15 mols halohydrin to product A give products useful for commercial application. Regulation of the molar ratio of the reactants directly effects the resulting molecular weight of the epoxide resin. For example, when molar ratios of about 8 mols of halohydrin per mol of product A are employed epoxide resins having molecular weight of about 500 to 800 are secured as compared to molecular weights of about 7000 to 10,000 when molar ratios of about 3:1 are utilized.

Generally, the alkali is utilized in excess of its stoichiometric amount of 2 mols alkali per mol product A. Conventional means of molecular weight regulation such as growth-inhibitors and chain terminators may also be employed if desired. Reaction temperatures in the range of about 70 to 120 with the preferred being 80 to 105° C. have been found to give excellent yields. It is understood that higher or lower reaction temperature may also be successfully employed with an inverse variation of reaction time. Also, use of inert organic solvents such as benzene, toluene, xylene may be utilized although the presence of such solvents tend to inhibit the rate of polymerization due to dilution.

These new epoxide resins prepared from the reaction of product A and a halohydrin derivative may be cured to thermoset condition by the addition of conventional curing agents such as diethylenetriamine, phenylenediamine, phthalic anhydride. If a greater degree of elasticity or flexibility is desired, the epoxide resin is further treated with conventional plasticizing agents. Such plasticizing procedures may be employed in conjunction with curing or modifying agents or, if desired, at a time subsequent. Heretofore many epoxide resins were unable to be modified since conventional plasticizers such as dioctyl phthalate, dioctyl adipate, tricresyl phosphate when added to epoxide resins, tended to seperate from the resin during curing and/or subsequent aging procedures. As illustrated in the examples hereinbelow described, the novel epoxide resin prepared from product A is readily compatible with these aforementioned plasticizing agents and greatly improved their physical and mechanical properties.

Examples 1 to 6 illustrate the preparation of the novel product A, while examples 6 to 10 illustrate its conversion to the corresponding epoxide resin. In the examples parts are by weight.

*Example 1*

A reaction vessel equipped with a mechanical stirrer was charged with 36.9 parts of p-diisopropylbenzene α,α'-diol and 15 parts of phenol in the presence of 60 parts of benzene as solvent. 6 patrs of an acid-activated clay catalyst were added (analysis: silica 87 percent; alumina 13 percent; pore diameter 200 A.; surface area, 300–600 square meters per gram). The reaction mixture was then heated to temperature of 80° C. for a period of 8 hours at the end of which period the temperature of the reaction mixture was decreased to 25° C. and the acid-activated clay catalyst was removed by filtration. The residue was washed with 30 parts of benzene and the resulting filtrate was combined with the filtrate previously obtained from the removal of the catalyst clay.

To these combined filtrates, 250 parts of water were added in order to effect azeotropic distillation of the benzene at 69.5° C. 44 parts of crude product A were isolated from the remaining aqueous phase by filtration. Upon being pulverized and dried, it was admixed with 150 parts of carbon tetrachloride at temperature of 77° C. for a period of 15 minutes in order to remove any impurities. The resulting solution was cooled to room temperature and permitted to stand for 12 hours during which period 6.4 parts of impurities separated and were removed by filtration. The filtrate was distilled in order to remove the remaining carbon tetrachloride and 37.6 parts of a fused solid identified as product A was obtained. This corresponded to a yield of 85.5 percent.

An infrared spectra analysis was conducted and indicated the presence of absorption bands at 12.09 and 11.32 microns which affirm the presence of 1,2,4-tri-substituted benzene rings as are present in the subject product A. In addition, absorption bands at 7.30 and 7.35 microns showed the presence of a gem dimethyl group substituted on the cyclic saturated five-membered ring. Further, the presence of strong absorption bands 2.99 and 8.20 microns showed the presence of phenolic hydroxide groups. Elemental analysis indicated 85.9 percent carbon and 8.38 percent hydrogen as compared to the theoretical of 87.8 carbon and 8.19 percent hydrogen. Potentiometric titration of the phenolic hydroxide groups showed 4.22 percent phenolic hydroxide groups as compared to the theoretical of 4.15 percent. In addition, the molecular weight of the above-identified compound was found to be 880 as compared to the theoretical value of 820. The isolated product A exhibited a softening point in the range of 90° to 105° C. and an inherent viscosity of 0.03 at 30° C. in a 5 percent by weight benzene solution.

In Table I, analogous procedures to that of Example 1 were employed and the data obtained therefrom are tabulated hereinbelow:

TABLE I

| Example | p-Diisopropylbenzene α,α'-diol | Phenol, Parts | Molar Ratio of Reactants | Acid Activated Clay, Parts | Benzene, Parts | Reaction Time, Hours | Product, Percent Yield |
|---|---|---|---|---|---|---|---|
| 2 | 12.3 | 5.0 | 0:83:1 | 2.0 | 20.0 | 8.0 | 86.5 |
| 3 | 6.15 | 5.0 | 1:67:1 | 1.0 | 10.0 | 1.0 | 69.4 |
| 4 | 6.15 | 5.0 | 1:67:1 | 1.0 | 10.0 | 8.0 | 66.0 |
| 5 | ¹ 17.3 | 4.2 | 0:71:1 | 2.0 | 20.0 | 4.0 | 95.4 |
| 6 | 111.0 | 38.0 | 0:71:1 | 18.0 | 180.0 | 6.0 | 88.0 |

¹ Meta-diisopropylbenzene-α,α'-diol.

The following examples are given to illustrate the conversion of product A to its corresponding epoxide resin.

*Example 7*

Into a reaction vessel equipped with reflux condenser, Thermowell, mechanical stirrer and a reagent feed-opening, a charge of 30.24 parts of product A was admixed with 33.3 parts of epichlorohydrin and 1 part water. The reaction mixture was stirred and heated to temperature of 95° C. for a period of 1 hour, whereupon 1.26 parts of sodium hydroxide were added. The reaction mixture was continuously agitated for an additional 15 minutes, cooled to about 75° C. and an additional quantity of 1.26 parts of sodium hydroxide were added. Two similar additions of sodium hydroxide were made at 15 minute intervals until a total of 5.04 parts of alkali has been added. The reaction mixture was then heated to temperature of 100° C. for a period of 30 minutes. Unreacted epichlorohydrin and water were stripped from the reaction mixture by vacuum distillation at temperature of 130° C. under 35 millimeters Hg pressure. The crude epoxide resin produced from product A was dissolved with 47.5 parts of acetone and filtered in order to remove the salt-of-reaction from the system. Isolation of the epoxide resin was attained by removal of acetone by vacuum distillation at 130° C. under 35 millimeters Hg pressure. A yield of 73 percent of opaque solid resin identified as the epoxide resin of product A was obtained which possessed a molecular weight of 994, a softening point of 107° C. and a relative viscosity of 1.08 in a 2 percent by weight dioxane solution.

Example 8

The procedure of Example 7 was repeated employing a charge of 50.4 parts of product A, 277.5 parts of epichlorohydrin and 2.3 parts of water. To the reaction mixture were added a total of 9.2 parts of sodium hydroxide in 4 equal increments at 15 minute intervals. A solid clear epoxide resin was obtained in the yield of 82 percent of theoretical. The epoxide resin prepared from product A possessed a molecular weight of 832, softening point of 84° C. and a relative viscosity of 1.08 in a 2 percent by weight dioxane solution.

The resin produced by Examples 7 and 8 were alternatively plasticized by the addition of 15 percent by weight of "Beetle 216–8" and a 10 percent by weight addition of dibutylphthalate. Beetle 216–8 is a plasticizer produced by the American Cyanamid Company and is composed of urea-formaldehyde resins. Detail analytical data regarding this plasticizer may be found in "Handbook of Material Trade Names," Zimmerman and Lavine, page 80 (1953). The plasticized material was cured to thermoset condition by the addition of diethylenetriamine followed by baking at temperature of 93° C. for a period of 45 minutes. The results obtained are given in Table II set forth hereinbelow:

TABLE II

| Resin | Physical Properties | | | | Chemical Properties | | |
| --- | --- | --- | --- | --- | --- | --- | --- |
| | Rocker Hardness | Tape Test | Mandrel Test | Impact Test | Water | 10% w. Acetic Acid | 5% w. Sodium Hydroxide |
| No plasticizer | 100 | Passed | Failed | Failed | No Effect | No Effect | No Effect. |
| 15% 216–8 Beetle Plasticizer | 76 | do | Passed | Passed | do | do | Do. |
| 10% Dibutyl Phthalate | 82 | do | do | do | do | do | Do. |

The above Rocker hardness and impact tests are described in "Organic Coating Technology," J. Wiley & Sons, pages 642–647 (1959). The mandrel test is described in the American Society for Testing Materials Manual, Test D522–41. The tape test was determined by making a V-shaped cut in the film pressing a strip of cellophane tape over the V and abruptly ripping away the tape, followed by an examination of the cellophane tape for any film adherence. The chemical properties of inertness to the above-recited solutions were made on films having thickness of 2.5 mils and employing a contact-time period of 24 hours.

As indicated by the data contained in Table II the subject epoxide resin although having sufficient hardness failed to pass either the mandrel or impact test, thereby evidencing a high rigidity which is readily subjected to chipping and cracking. In contrast the epoxide resin plasticized with conventional agents maintained sufficient hardness and possessed a substantial degree of flexibility and elasticity as indicated by the mandrel and impact tests.

Example 9

The process of Example 7 was repeated employing a reaction charge consisting of 22.68 parts of product A 41.62 parts of epichlorohydrin and 0.42 part water. The reaction mixture was maintained at temperature of 95° C. for a period of 1 hour during which time a total of 3.78 parts alkali were added in 4 equal increments at 15 minute intervals. After the crude epoxide resin was purified as in Example 1, an 83 percent yield of epoxide resin was obtained having a molecular weight of 836, a softening point of 88° C. and a relative viscosity of 1.08 in a 2 percent by weight dioxane solution.

Example 10

A process employed in Example 7 was repeated with a reaction charge of 22.68 parts of product A, 83.45 parts of epichlorohydrin and 1.36 parts water. Once again, 4.41 parts of sodium hydroxide were added in 4 equal increments at 15 minute intervals. The reaction mixture was heated to temperature of 95° C. for 2 hours at the end of which time a clear epoxide resin was obtained in 85 percent yield. This resulting resin possessed a molecular weight of 770, softening point of 61° C. and a relative viscosity of 1.78 and a 2 percent by weight dioxane solution.

While the above examples described the preferred embodiment of the present invention it is understood that changes and modifications may be made within the scope of the appended claims without departing from the spirit thereof.

We claim:

1. A process for the production of a compound suitable for use in preparing epoxide resins and having the formula:

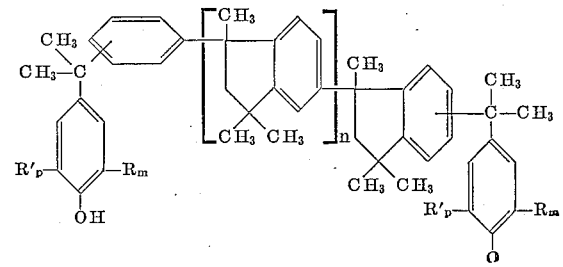

wherein R and R' are selected from the group consisting of methyl, ethyl, methoxy, ethoxy, chloro, bromo, iodo and fluoro and m and p represent the integers 0 to 1 and n represents an integer from 0 to 8, which comprises reacting diisopropyl-benzene-α,α'-diol with a phenolic compound having the formula:

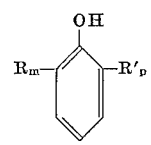

wherein R and R' are selected from the group consisting of methyl, ethyl, methoxy, ethoxy, chloro, bromo, iodo and fluoro and m and p represent the integers 0 and 1, in a molar proportion from about 0.5 to 4 mols phenolic compound per mol of diiso-propylbenzene-α,α'-diol at a temperature within the range of about 30° to 200° C. in the presence of an inert organic solvent and in the presence of an acid-activated silicious catalyst.

2. A process for the production of a compound suitable for use in preparing epoxide resins and having the formula:

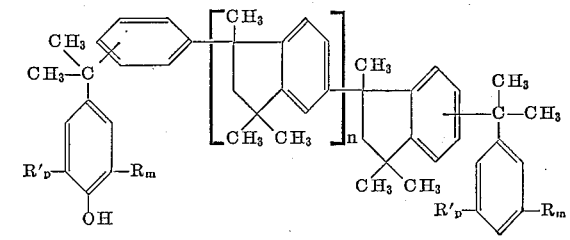

wherein R and R' are selected from the group consisting of methyl, ethyl, methoxy, ethoxy, chloro, bromo, iodo and fluoro and $m$ and $p$ represent the integers 0 and 1 and $n$ represents an integer from 0 to 5, which comprises reacting diisopropyl-benzene-α,α'-diol with a phenolic compound having the formula:

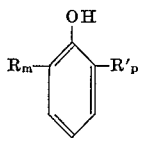

wherein R and R" are selected from the group consisting of methyl, ethyl, methoxy, ethoxy, chloro, bromo, iodo and fluoro and $m$ and $p$ represent the integers 0 and 1, in a molar proportion from about 0.8 to 1.1 mols phenolic compound per mol of diisopropylbenzene-α,α'-diol at a temperature within the range of about 80° to 150° C. in the presence of an inert organic solvent and in the presence of an acid-activated silicious catalyst.

3. A process as claimed in claim 2 wherein the diisopropylbenzene-α,α'-diol is para-diisopropylbenzene-α,α'-diol.

4. A process as claimed in claim 2 wherein the diisopropylbenzene-α,α'-diol is meta-diisopropylbenzene-α,α'-diol.

5. A compound having the formula:

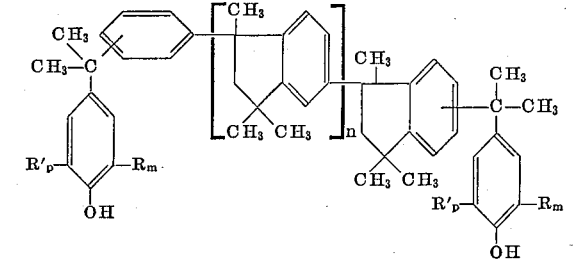

wherein R and R" are selected from the group consisting of methyl, ethyl, methoxy, ethoxy, chloro, bromo, iodo and fluoro and $m$ and $p$ represent the integers 0 and 1 and $n$ represents an integer from 0 to 8.

References Cited by the Examiner
UNITED STATES PATENTS

| | | | |
|---|---|---|---|
| 1,754,052 | 4/1930 | Rosenthal et al. | 260—619 |
| 2,176,881 | 10/1939 | Burroughs | 260—810 |
| 2,634,297 | 4/1953 | Moyle | 260—619 |
| 2,767,157 | 10/1956 | Masters | 260—47 |
| 2,801,989 | 8/1957 | Farnham | 260—47 |

LEON ZITVER, *Primary Examiner.*

J. R. LIBERMAN, DANIEL D. HORWITZ, *Examiners.*

R. D. KERWIN, D. M. HELFER, *Assistant Examiners.*